3,480,847
DIELECTRIC CAPACITOR WITH IMPREGNATED PAPER BETWEEN THE ELECTRODES, SAID PAPER CONTAINING CELLULOSIC FIBERS AND AMPHIBOLIC ASBESTOS
Edgar F. Sewell, West Stockbridge, and William A. Selke, Stockbridge, Mass., assignors to Kimberly-Clark Corporation, a corporation of Delaware
No Drawing. Filed May 11, 1966, Ser. No. 549,149
Int. Cl. H01g 3/00; D21h 5/18
U.S. Cl. 317—259                                2 Claims

ABSTRACT OF THE DISCLOSURE

A dielectric capacitor comprising electrodes with impregnated paper therebetween, said paper containing cellulosic papermaking fibers and amphibolic asbestos selected from among anthophyllite, tremolite, and amosite, as an adsorbent scavanger for ionic constituents in the impregnant. Asbestos may also be part of the paper wrapper for the wound capacitor body.

---

This invention relates generally to paper, and has particular reference to paper intended for use in electrical capacitors in which the paper is immersed in a dielectric impregnant, usually a chlorinated hydrocarbon.

Coordinately, the invention relates to capacitors employing such paper.

A general objective is to improve the performance and life characteristics of capacitors of the type referred to, by inactivating organic ionic constituents that may be present in the impregnating medium. Such constituents may originate in the paper itself, since they are present to some degree in the wood pulp from which the paper is made, or they may enter the capacitor during the course of manufacture, or may stem from degradation products formed during normal service aging of the paper or of the impregnant employed.

A more particular object of the invention is to provide paper which embodies within itself, as component parts of its fibrous structure, fibers having the ability to adsorb the ionic constituents to be inactivated.

The invention is predicated upon the discovery that certain amphibolic asbestoses, namely, anthophyllite, tremolite, and amosite, are uniquely adapted to serve as effective adsorbents of the character referred to. They are delicately-fibered materials which are well-suited to become integrated parts of a paper web; their presence in the paper in relatively small amounts is sufficient to reduce the "power factor" of capacitors in which the paper is employed; and when used in selected small amounts lying within prescribed ranges the beneficial effects manifest themselves to maximum advantages without serious adverse effect on the power factor, dielectric strength, or mechanical properties of the paper.

Paper incorporating the special scavenging asbestos additive can be used as a dielectric between foils or electrodes of the capacitor, or as a wrapper surrounding the capacitor body. In the former case, the additive is most efficient when it constitutes from 0.1% to 8.0% by weight of the main papermaking cellulosic fibers. In the wrapper, the optimum range is between 6% and 30%.

Paper of the improved kind is intended primarily for capacitors of the "paper dielectric" type in which strips of tissue are interwound with strips of conductive foil to form a condenser body which is subjected to heat and vacuum, then impregnated with a dielectric liquid substance, usually a chlorinated hydrocarbon of the "askarel" variety, sometimes hydrocarbon oil, and possibly mixtures with sulfones. The operating and performance characteristics of such a capacitor can be markedly improved by inactivating ions in the impregnating medium.

Adsorbents heretofore proposed for the purpose have been particulate in nature, e.g., granular substances such as oxides and hydroxides of magnesium, aluminum, silicon, and titanium. Among the shortcomings of such materials are relatively high cost, complication of customary manufacturing techniques, the difficulty in reliably retaining small particles of solid matter in uniform distribution throughout a fibrous sheet, and the fact that appreciable amounts must be used in order to provide required adsorption. The use of a large proportion of inorganic material in the paper-making stock is undesirable since it tends to impair dielectric strength.

By means of the present invention these difficulties and disadvantages are overcome; and moreover the employment of one or more of the amphibolic asbestoses referred to achieves numerous advantages not heretofore attainable at all. The anthophyllite, tremolite, and amosite asbestoses combine physicochemical qualities which make them uniquely suitable for the purposes of this invention. They are fibrous in nature, thus intermeshing readily with the main paper-making fibers on the wire of the papermaking machine and becoming integrated with the paper web in uniformly distributed state. Their fibers are delicate and fine, affording a desirably high aspect ratio. They are relatively low in cost, and they are suitably adsorbent. Moreover, the employment of any one or more of these asbestoses, in an appropriately selected small proportion, as an integral minor fibrous component of a paper web, does not impair either its dielectric or tensile strength; and it permits the improved paper to be manufactured by conventional techniques on a practicable and economical commercial basis. The scavenging effect of the asbestos contributes markedly to a reduction in the power factor of a capacitor in which the paper is used. The term "power factor," as used in relation to a capacitor, is the proportion of in-phase current flowing through the capacitor. In-phase current induces power loss producing undesirable heat and the objective is to reduce it to as low a percentage as possible.

Only small proportions of the asbestos additive are required. When the paper is utilized in the dielectric of the capacitor, asbestos fibers utilized in a relatively minute amount, e.g., as low as 0.1%, by weight, of the main paper fibers, are able to inactivate ions in the impregnating medium to a degree which materially reduces the power factor losses of the capacitor, and keeps these losses low even after long periods of use. When utilized in wrapper paper, the asbestos fibers are most effective when they are present in an amount not exceeding 30% by weight, of the main fibers of which the wrapper sheet is composed.

The power factor of a capacitor subjected to alternating current is composed of the sum of the power factors of the dielectric tissue and the liquid phase or impregnant. Losses contributed by the paper dielectric are inherent in its composition as a result of the dipole relaxation mechanism causing in-phase power losses. Power factor losses contributed by the liquid phase occur from the presence of soluble ionic materials which conduct current. The addition of inorganic adsorbents to the paper dielectric will remove these liquid phase constituents.

The adsorptive effectiveness of the asbestoses has been established by tests devised for that purpose. First, 30 grams of capacitor tissue of good power factor was extracted with isopropanol. This extract was dried and 200 cc. of Aroclor 1242 (Monsanto's trademark for trichlorobiphenyl) was mixed with the dry residue. Twenty cc. portions of this Aroclor solution were taken for each test. The asbestoses or other adsorbent solids were mixed with the portions of Aroclor. After the mixture was centrifuged, the power factor of the supernatant clear liquid was measured at 70° C. using a General Radio 1511A bridge. As a control, a test was made without any additive. The following table sets forth the results of the test.

TABLE I

| Additive: | Percent power factor at 70° C. |
|---|---|
| None | 48 |
| Anthophyllite asbestos, 1.0% | 0.2 |
| Anthophyllite asbestos, 0.30% | 9 |
| Tremolite asbestos, 0.95% | 9 |
| Crocidolite asbestos, 0.29% | 20 |
| Amosite asbestos, 0.31% | 11 |
| Chrysotile asbestos, 0.32% | 12 |
| Alumina, 1.1% | 10 |
| Kieselguhr, 0.98% | 13 |
| Magnesium oxide, 1.0% | 16 |
| Bentonite, 0.95% | 14 |
| Kaolinite, 1.1% | 12 |

The anthophyllite, tremolite, and amosite asbestoses are seen to be at least as effective as, and in some cases more effective than, inorganic adsorbents such as bentonite, kaolinite, kieselguhr, magnesium oxide, alumina, etc. The asbestoses referred to are uniformly more adsorptive than crocidolite and chrysotile asbestoses; and moreover, they have no adverse influence upon the power factor of the capacitor tissue itself, whereas crocidolite and chrysotile asbestos brought about a material increase in the power factor of the paper, especially at higher temperatures. Tabulated below is a comparison of the effects of certain asbestoses upon power factor of unimpregnated capacitor tissue. The comparison is made using 0.00055 inch 0.75 density, paper containing 0.6% of each of the adsorbents.

TABLE II

| Sample | Temp. (° C.) | | |
|---|---|---|---|
| | 40 | 100 | 120 |
| | Percent Power Factor | | |
| Regular capacitor tissue: | | | |
| No asbestos | 0.092 | 0.087 | 0.104 |
| With anthophyllite asbestos | 0.090 | 0.085 | 0.103 |
| With tremolite asbestos | 0.095 | 0.089 | 0.107 |
| With amosite asbestos | 0.093 | 0.088 | 0.106 |
| With crocidolite asbestos | 0.118 | 0.267 | 0.336 |
| With Arizona chrysotile asbestos | 0.111 | 0.113 | 0.140 |
| With California chrysotile asbestos | 0.221 | 0.312 | 0.367 |

The following examples are illustrative of the way in which the invention may be practiced and its objectives achieved to maximum advantage:

EXAMPLE I

As a control, a capacitor was built as follows: Tissue was made, using a stock composed of special high purity unbleached Dryden condenser pulp. When dried, the paper had a thickness of 0.0004 inch, a density of 0.9, and a dielectric strength of 1500 volts per mil. A capacitor winding was prepared, using three layers of this tissue as the dielectric between conductive foils, placed in a paper wrapper within a can, and in usual fashion the winding was treated under heat and vacuum, then impregnated with a chlorinated hydrocarbon impregnant ("Aroclor 1242"). The resultant capacitor when tested at 100° C., using a General Radio 1611A bridge, had a capacitance of 2.36 microfarads and a power factor of 0.63%.

EXAMPLE Ia

An identical capacitor was made, using tissue in which anthophyllite asbestos fibers were added to the stock in an amount equal to 0.12% by weight of the main papermaking fibers. When tested under the same conditions as in Example I, the capacitor when made had a power factor of 0.28%.

EXAMPLE Ib

A capacitor was made as in Example Ia, except that the tissue contained .8% of the anthophyllite asbestos. The capacitor had a power factor of 0.26%.

EXAMPLE Ic

A capacitor was made as in Examples Ia and Ib except that the tissue contained anthophyllite asbestos in an amount equal to 1.1% of the weight of the wood pulp fibers. It was similarly tested, and manifested a power factor of 0.29%.

EXAMPLE Id

A capacitor was made, as in the above examples, with tissue containing 7.9% of the anthophyllite asbestos. The capacitor had a power factor of 0.41%.

Example II

A capacitor was made, to serve as a basis for comparison, employing tissue composed (as in Example I) of special high purity unbleached Dryden condenser pulp. The dry paper had a thickness of 0.00055 inch, a density of 0.75, and a dielectric strength of 1000 volts per mil. The capacitor winding employed two layers of this tissue between conducting foils. The capacitor was made in accordance with the procedure described in Example I, employing "Aroclor 1242" as the impregnant. Upon completion it had a capacitance of 1.18 microfarads and a power factor of 0.46%.

Example IIa

A capacitor was made in precisely the same way, except that the tissue contained tremolite asbestos fibers in an amount equal to 0.11% by weight of the basic paper pulp. The power factor of the capacitor was 0.20%, an appreciable decrease clearly resulting from the scavenging effect of the asbestos upon the ionic constituents in the impregnant.

Example IIb

A capacitor was made, by the procedure described in Example II, with tissue containing .8% of the tremolite asbestos. The capacitor had a power factor of 0.19%.

Example IIc

A similar capacitor was made, in accordance with the procedure described in Example II, employing tissue in which the tremolite asbestos was 1.2% by weight of the main papermaking pulp. The capacitor had a power factor of 0.21%.

Example IId

A similar capacitor was made, by the procedure described in Example II, with tissue containing 8.1% of the tremolite asbestos. When tested, the power factor was 0.35%.

Example III

As a basis for comparison, a capacitor was made in accordance with the general procedures described, employing tissue essentially like that of Example I. Its thickness was 0.0004 inch, its density 0.91, and its dielectric strength 1500 volts per mil. Three layers of tissue were interposed between foils, and "Aroclor 1242" was the impregnant used. The capacitor had a capacitance of 2.35 microfarads and a power factor of 0.65%.

Example IIIa

A capacitor like that of Example III was made, employing tissue to which amosite asbestos had been added, the asbestos fibers constituting 0.12% by weight of the pulp. The power factor of the capacitor was 0.29%.

Example IIIb

A capacitor was made by the procedure of Example III, with tissue containing .8% of the amosite asbestos. The power factor of the capacitor was 0.27%.

Example IIIc

A capacitor like that of Example III was made, using paper containing 1.2% by weight of the amosite fibers. The power factor of the capacitor was 0.30%.

Example IIId

Another capacitor was made, by the procedure of Example III, with tissue containing 8% of amosite asbestos. The capacitor had a power factor of 0.43%.

These examples indicate that the desired effect is achieved when the proportion of asbestos fibers is in the lower part of the useful range between about 0.1% and 8.0%, and that the optimum effect is achieved with about .8% of asbestos fibers. When the amount of asbestos added to the tissue exceeds about 8% by weight, of the base paper making fibers, no appreciable increase in scavenging effect is observed, and in fact an undesirable and commercially unacceptable impairment of dielectric strength tends to occur. In one test it was found that the dielectric strength of a capacitor tissue having a basis weight of 4.2 pounds, a thickness of 0.0006 inch and a density of 0.70 was 962 volts per mil, whereas the dielectric strength of a tissue, differing only in that it contained 8% asbestos, was 832 volts per mil.

The selected one or more of the anthophyllite, tremolite, and amosite asbestoses may be present in any one or more of the tissue spacing layers. It may also, (or alternatively) be present in the wrapper which surrounds the wound condenser body and lies between it and the can. In such a case, the dielectric strength is not so important, and the maximum useful proportion of asbestos is limited by the deterioration in tensile strength which it brings about.

Example IV

As a control, five capaictors were made, using in each case two sheets of capacitor tissue between foil electrodes, the tissue having a thickness of 0.00025 inch, a density of 1.0 and a dielectric strength of 2100 volts per mil. Each wound condenser body was enclosed in a wrapper of regular 0.003 inch kraft paper. After canning, drying, and impregnating with "Aroclor 1242" the cans were sealed. The capacitors were then heated, and tested at 100° C., using the General Radio 1611A bridge. The capacitance and power factor values were averaged and found to be 0.99 mf. and 0.46% respectively. The terminal-to-case power factor was also measured and found to be 1.7%. (The latter measurement is an extremely sensitive indication of the relative purity of the impregnant.)

Examples IVa–f

Other capacitors were made, exactly as described in Example IV, except that the wrapper was caused to embody varying amounts of the three amphibolic asbestoses hereinbefore referred to. Tested and averaged as in Example IV, the measured values were:

*Example IVa.*—Wrapper with 6%, by weight, of anthophyllite asbestos: capacitance 0.98 mf.; power factor, terminal-to-terminal 0.36%; power factor, terminal-to-case 0.53%.

*Example IVb.*—Wrapper with 25% of anthophyllite asbestos: capacitance 0.96 mf.; power factor terminal-to-terminal 0.30%; power factor, terminal-to-case 0.58%.

*Example IVc.*—Wrapper with 6% of tremolite asbestos: capacitance 0.97 mf.; power factor terminal-to-terminal 0.38%; power factor, terminal-to-case 0.57%.

*Example IVd.*—Wrapper with 25% of tremolite asbestos: capacitance 0.98 mf.; power factor terminal-to-terminal 0.31%; power factor, terminal-to-case 0.62%.

*Example IVe.*—Wrapper with 6% of amosite asbestos: capacitance 0.99 mf.; power factor terminal-to-terminal 0.39%; power factor terminal-to-case 0.54%.

*Example IVf.*—Wrapper with 25% of amosite asbestos: capacitance 0.98 mf.; power factor terminal-to-terminal 0.31%; power factor terminal-to-case 0.59%.

These examples indicate the marked effectiveness of the asbestos additives, as scavengers of ionic constituents in the impregnating liquid, when incorporated in the paper wrapper. Higher levels of the asbestos can be tolerated because the need for dielectric strength is not as stringent. It has been found, however, that the tensile strength of the wrapper falls to an undesirable and commercially unacceptable degree (e.g. from a normal 17.6 kg. per inch to only 9.1 kg. per inch) if the amount of asbestos exceeds 30% by weight.

The adsorbent can be used, of course, in both the dielectric tissue and the wrapper, if desired. However used, its purification of the impregnating medium leads to a more advantageous service life of the capacitor. Its beneficial effects are not restricted to any specific impregnating medium, but are observable in connection with any organic liquid dielectric impregnant that might carry ions. This includes the numerous chlorinated hydrocarbons which are currently in wide use, and hydrocarbon oil, as well as for example the materials mixed with sulfones.

What is claimed is:

1. An electrical capacitor of improved aging and power factor characteristics comprising at least two electrodes with paper interposed between said electrodes, said paper being impregnated with a dielectric liquid, and said paper comprising cellulosic papermaking fibers and a scavenging additive for adsorbing organic constituents in said liquid impregnant, said scavenging additive being amphibolic asbestos fibers forming an integral part of the paper, said asbestos fibers being selected from the group consisting of anthophyllite, tremolite, and amosite, and constituting between 0.1% and 8% by weight of the cellulosic papermaking fibers.

2. An electrical capacitor of improved aging and power factor characteristics comprising at least two electrodes with paper interposed between said electrodes, said paper being impregnated with a dielectric liquid, said electrodes comprising strips of conductive foil which are interwound with strips of said paper to form a wound capacitor body, a paper wrapper enclosing said body, said paper comprising cellulosic papermaking fibers and a scavenging additive for adsorbing organic constituents in said liquid impregnant, said scavenging additive being amphibolic asbestos fibers forming an integral part of said paper wrapper, said asbestos fibers being selected from the group consisting of anthophyllite, tremolite, and amosite, and constituting between 6 and 30% by weight of the cellulosic papermaking fibers of said wrapper.

References Cited

UNITED STATES PATENTS

| | | | |
|---|---|---|---|
| 3,337,392 | 8/1967 | Carlson et al. | 162—138 |
| 3,385,752 | 5/1968 | Selke et al. | 162—138 |

S. LEON BASHORE, Primary Examiner

R. H. TUSHIN, Assistant Examiner

U.S. Cl. X.R.

162—138, 145; 317—258